June 30, 1964 C. F. ELAM ETAL 3,138,959
MULTIPLE CARBURETOR AIR FLOW MEASURING DEVICE
Filed Nov. 18, 1960

INVENTORS
Charles F. Elam &
BY Ernest R. Stettner
L. P. Barnard
ATTORNEY

_United States Patent Office_

3,138,959
Patented June 30, 1964

3,138,959
MULTIPLE CARBURETOR AIR FLOW
MEASURING DEVICE
Charles F. Elam, Rochester, and Ernest R. Stettner, Spencerport, N.Y., assignors to General Motors Corporation, Detroit, Mich., a corporation of Delaware
Filed Nov. 18, 1960, Ser. No. 70,279
1 Claim. (Cl. 73—401)

The present invention relates to a device for measuring and facilitating the balancing of air flow through a plurality of carburetors adapted to supply the fuel-air mixture to an internal combustion engine.

Wherever multiple carburetors are used for supplying the fuel-air mixture to an internal combustion engine, there exists the problem of insuring equal air flows through these carburetors in order that the power output of the cylinders supplied by the various carburetors is essentially equal. In the present invention a unique manometer type device has been developed for ready mounting on a vehicle proximate the engine such that the aforenoted air flows may be balanced without disassembling the carburetors from the engine.

More specifically the present device includes a multiple tube manometer mounted on a centrally disposed adjustable bracket the latter which in turn supports the manometer on the vehicle body. The pivotal bracket in turn includes a magnetized portion which facilitates positioning of the manometer on a vehicle body surface proximate the engine in a manner permitting ready adjustment of the instrument.

The details as well as other objects and advantages of the subject device will be apparent from a perusal of the detailed description which follows.

A vehicle is indicated generally at 10 and includes an engine compartment 12 within which an internal combustion engine 14 is disposed. In the installation illustrated, carburetors 16 and 18 are adapted to supply the fuel-air mixture to respective cylinder banks of engine 14. The operation of the carburetors 16 and 18, so far as the present invention is concerned, is conventional and constitutes no part of the present invention.

Figure 2:
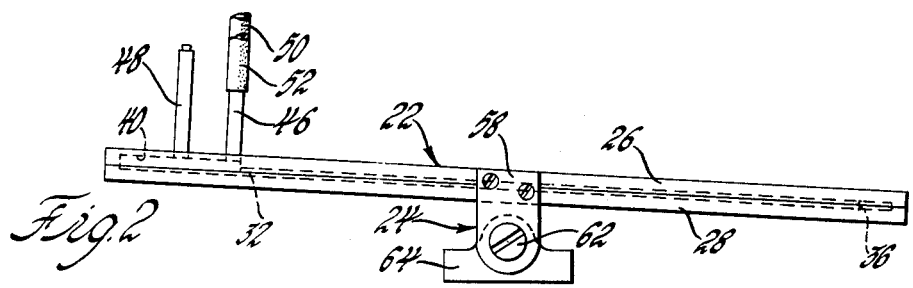
FIGURE 2 is an elevational view of the subject device.
Figure 3:
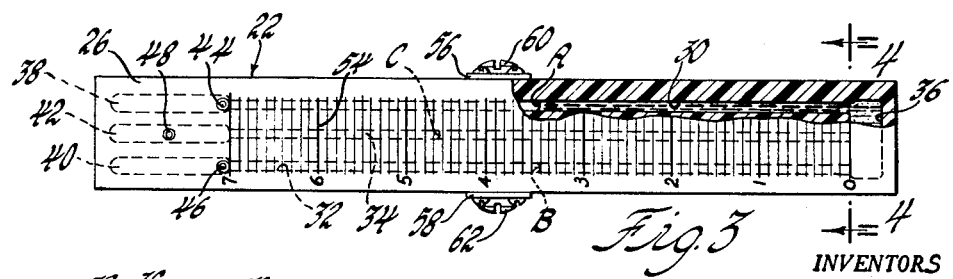
FIGURE 3 is a plan view of FIGURE 2.
Figure 4:
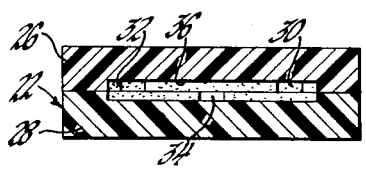
FIGURE 4 is a view along line 4—4 of FIGURE 3.

An air flow measuring device is shown in detail in FIGURES 2 through 4 and includes a manometer 22 and a supporting bracket 24. As best seen in FIGURES 3 and 4, manometer 22 may be formed of any suitable transparent material such as plastic or glass and includes mating upper and lower portions 26 and 28. In the preferred embodiment, as shown, upper portion 26 includes a pair of transversely spaced tubes 30 and 32 formed therein while lower portion 28 includes a tube 34 formed therein and disposed intermediate legs 30 and 32. Appropriate channels are formed, e.g., milled, in the abutting faces of upper and lower portions 26 and 28 and which faces coact with the channels when the portions are joined together to form tubes 30, 32 and 34.

The lower ends of tubes 30, 32 and 34 communicate with a common reservoir 36 a portion of which is formed in each of the upper and lower members 26 and 28. The upper ends of the manometer tubes include enlarged portions 38, 40 and 42 which respectively communicate with conduits 44, 46 and 48 projecting vertically from the upper face of manometer member 26.

The tubes of the manometer may be initially partially filled with any suitable manometric fluid such as mercury, kerosene, alcohol, or the like, through any one of the tubes 44, 46 or 48. The manometric fluid is indicated by the dash lines of the broken-away shaded portion of FIGURE 3.

While all three of the conduits 44, 46 and 48 may be suitably connected to air flowing devices to measure or indicate flow differentials, in the preferred embodiment of the present invention the center tube 34 will normally be opened to atmosphere while the outer tubes 30 and 32 will be communicated through suitable flexible tubes 50 and 52 with the induction passages of spaced carburetors 16 and 18. In this instance center tube 34 is utilized to measure the total pressure acting in the outer tubes 30 and 32. Accordingly, the total air flow through an engine may be measured under any particular engine operating condition, e.g., idle, hot or cold, or wide open throttle, etc. by noting the height of the fluid column in tube 34 and converting the same to cubic feet/minute.

If all manometer tubes were subjected to the same pressure, for example atmospheric, the fluid columns would normally be of equal height, as are the outer columns as indicated in FIGURE 3. However, to increase the utility of the subject device a predetermined reference differential is established between center tube 34 and the outer tubes 30 and 32 by displacing the center tube vertically below the outer tubes as seen in FIGURE 4. In this way the center tube fluid column will read higher on the scale 54 when the manometer is inclined as shown in FIGURES 2 and 3. For descriptive purposes, the tops of the respective fluid columns in tubes 30, 32 and 34 have been designated as points A, B and C. Thus to set up the device for operation, predetermined calibrations would require manometer 22 to be inclined until a predetermined differential exists between points A-B and point C when the engine is inoperative. Thereafter air flows through the engine can be checked by determining that certain other predetermined differentials should exist betweens A-B and point C under varying operating conditions, e.g., idle, 30 degree throttle, full throttle, etc.

Before referring further to the operation of the subject device, supporting bracket 24 will be described. Bracket 24 includes a pair of legs 56 and 58 centrally fixed to manometer 22 and projecting downwardly therefrom. Legs 56 and 58 have openings formed in the lower portion thereof to receive a shaft or screw members 60 and 62 through which the legs are secured to a base member 64. The connection of legs 56 and 58 to base 64 is such that the legs and manometer may be pivoted or inclined relative to the base.

Base 64 is formed of a magnetizable material or includes a magnetized portion whereby the instrument may be mounted on the vehicle body proximate the engine. The magnetized base provides means for adjustably mounting the manometer on the contoured body surface whereby the fluid columns may be leveled prior to testing use. This function coupled with the ability to pivot the manometer relative to the base to establish certain reference readings on the fluid columns results in a highly useful testing device through which carburetor air flows may be measured and balanced with minimum disruption of engine parts.

Figure 1:
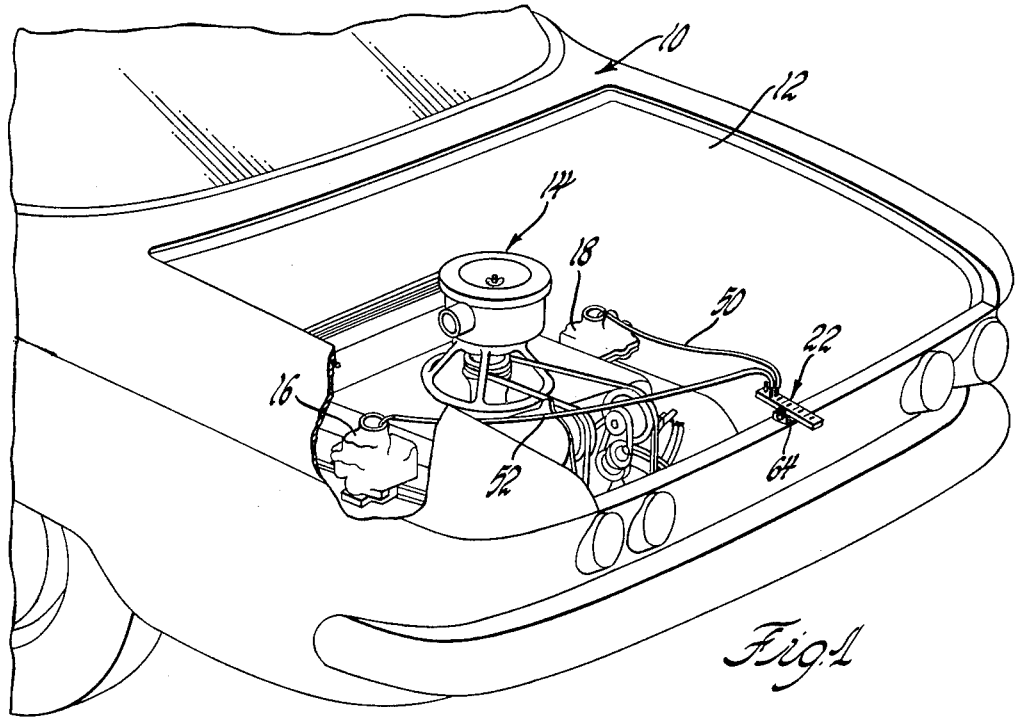
FIGURE 1 shows the subject measuring device mounted on a vehicle body and cooperating with the multiple carburetor installation on an internal combustion engine.

With the device as heretofore described, the air flows through carburetors 16 and 18 may be balanced in relation to each other as well as being individually regulated to insure predetermined air flows under various operating conditions. The manner in which these adjustments may be achieved will now be described. To balance air flow through carburetors 16 and 18, the device 22–24 is mounted on vehicle body 10 as indicated in FIGURE 1. The flexible tubes 50 and 52 are inserted within the carburetor induction passages. Before starting the engine, manometer device 22-24 is suitably adjusted on the vehicle body so that the heights of the fluid columns in tubes 30 and 32 are equal, as shown in FIGURE 3. Thereafter upon starting the engine, if a flow imbalance exists between the carburetors, this situation will be reflected in a pressure differential transmitted to the manometer through tubes 50 and 52 causing a height differential to appear between the fluid columns in tubes 30 and 32. Thereafter, the throttle linkages of one or both of the carburetors may be adjusted to equalize air flow which will be visually confirmed when the heights of the fluid in tubes 30 and 32 are again equal. In this way the mechanic or vehicle owner may visually observe the changes in air flow as the aforesaid mechanical adjustments are made in the throttle position.

To further illustrate, to balance air flow under idling conditions the same basic procedure will be followed except that in this instance the throttle valve levers are allowed to rest against the throttle stops which are, in turn, adjusted to vary the throttle opening until balanced air flow is achieved.

Following the same general procedure the total air flow to the engine under any particular operating condition may be adjusted by individually adjusting the throttle linkages or throttle stops (in the case of idle air flow) to provide the appropriate total air flow reading on middle manometer tube 34 while at the same time maintaining the column heights in outer tubes 30 and 32 equal. It is apparent that with this device the power output of an internal combustion engine relying on multiple carburetor installations may be maximized to the extent that air flow has an effect thereon.

The subject device has considerable utility one further illustration of which will suffice for present purposes. The subject device might also be used to determine air leaks in the carburetion system. This may be achieved by using the subject device in conjunction with a tachometer. In this way, if the air flow through the carburetor or carburetors is less than specified for a given engine speed, this would indicate a leakage of air in the system which would be reducing engine power output.

We claim:

An air flow measuring device of the manometric type including an elongated member formed of transparent material having at least three parallel passages formed internally and extending longitudinally of said member, one of said passages being vertically spaced relative to the other passages, said passages openly communicating at one end with a common reservoir, a manometric fluid disposed in said reservoir and adapted to partially fill said passages, a scale formed on said member for determining the height of fluid in each of said passages, conduits respectively communicating with the ends of said passages remote from said reservoir for transmitting a pressure force to each of said passages to vary the height of the manometric fluid column therein, bracket means secured to said transparent member substantially midway between the ends thereof, a base member, and means for pivotally connecting said bracket to said base member whereby the inclination of said bracket and said member may be varied relative to said base, said base including means for releasably securing said device to any suitable supporting surface, said elongated member being divided along a horizontal plane to form upper and lower halves, said halves being secured along abutting faces to provide a unitary structure, a pair of channels formed in the abutting face of the upper half and a channel formed in the abutting face of the lower half and disposed intermediate said pair of channels, said abutting faces coacting to enclose said channels to form said passages.

References Cited in the file of this patent
UNITED STATES PATENTS

| | | |
|---|---|---|
| 1,917,637 | Dwyer | July 11, 1933 |
| 2,896,452 | Cogniat et al. | July 28, 1959 |

FOREIGN PATENTS

| | | |
|---|---|---|
| 408,891 | Germany | Jan. 27, 1925 |